(12) United States Patent
Shang et al.

(10) Patent No.: US 10,697,853 B2
(45) Date of Patent: Jun. 30, 2020

(54) OPTICAL FIBER DISTRIBUTED MONITORING SYSTEM AND METHOD

(71) Applicant: Laser Institute of Shandong Academy of Sciences, Ji'ning, Shandong (CN)

(72) Inventors: Ying Shang, Shandong (CN); Chen Wang, Shandong (CN); Chang Wang, Shandong (CN); Jiasheng Ni, Shandong (CN); Chang Li, Shandong (CN); Bing Cao, Shandong (CN); Wen'an Zhao, Shandong (CN); Sheng Huang, Shandong (CN); Yang Liu, Shandong (CN); Xiaohui Liu, Shandong (CN); Yingying Wang, Shandong (CN)

(73) Assignee: Laser Institute of Shandong Academy of Sciences, Ji'ning, Shandong (CN)

( * ) Notice: Subject to any disclaimer, the term of this patent is extended or adjusted under 35 U.S.C. 154(b) by 46 days.

(21) Appl. No.: 16/188,765

(22) Filed: Nov. 13, 2018

(65) Prior Publication Data

US 2020/0056959 A1   Feb. 20, 2020

(30) Foreign Application Priority Data

Aug. 17, 2018   (CN) .......................... 2018 1 0946238

(51) Int. Cl.
*G01B 9/02* (2006.01)
*G01M 11/00* (2006.01)

(52) U.S. Cl.
CPC ....... *G01M 11/331* (2013.01); *G01B 9/02041* (2013.01); *G01B 9/02056* (2013.01)

(58) Field of Classification Search
CPC ............ G01B 9/02014; G01B 9/02041; G01D 5/353; G01D 5/35303; G01D 5/35306; G01D 5/35332; G01D 5/35361
See application file for complete search history.

(56) References Cited

U.S. PATENT DOCUMENTS

| | | | | | |
|---|---|---|---|---|---|
| 5,051,965 A | * | 9/1991 | Poorman | ................. | G01H 9/004 367/149 |
| 5,680,489 A | * | 10/1997 | Kersey | ............... | G01D 5/35383 385/12 |
| 5,898,517 A | * | 4/1999 | Weis | ..................... | E21B 47/123 356/32 |
| 6,137,565 A | * | 10/2000 | Ecke | ........................ | G01J 5/60 356/35.5 |

\* cited by examiner

*Primary Examiner* — Jonathan M Hansen
(74) *Attorney, Agent, or Firm* — Banner & Witcoff, Ltd.

(57) ABSTRACT

An optical fiber distributed monitoring system and method is provided. The system includes a laser device, an acousto-optic modulator, a phase matching interferometer, a photo-electric detector and a phase demodulation module. After entering the phase matching interferometer, the Rayleigh backscattering light containing parameter information output from the sensing optical fiber enters the two arms of the phase matching interferometer respectively, and the light of the two arms of the phase matching interferometer is phase-modulated by the first modulation wave and the second modulation wave, respectively and then interfere with each other to generate interference light. The photoelectric detector converts a light signal into an electric signal, and the phase demodulation module processes the electric signal based on the Hilbert algorithm to obtain the parameter change of the environment under test.

16 Claims, 4 Drawing Sheets

OPTICAL FIBER DISTRIBUTED MONITORING SYSTEM AND METHOD

CROSS-REFERENCE TO RELATED APPLICATIONS

This application claims priority to Chinese Patent Application No. 201810946238.1, filed with the Chinese National Intellectual Property Administration on Aug. 17, 2018, entitled "Closure Cover and Extension Ladder", which is incorporated herein by reference in its entirety.

BACKGROUND ART

The optical fiber distributed sensing technology allows for continuous measurement on external physical parameters distributed along a geometric path of optical fiber, and is widely used in the fields of intelligent bridge, expressway, important building and gas pipeline monitoring, etc. With regard to optical fiber distributed monitoring, there are mainly two kinds of distributed monitoring systems, i.e., intensity demodulation-based distributed monitoring systems and phase demodulation-based distributed monitoring systems, wherein the intensity demodulation distributed monitoring systems can only demodulate the light intensity variation information of the Rayleigh backscattering light in a unit pulse and has a limited application scope, while the phase demodulation distributed monitoring systems can demodulate the phase information of the interference light of the Rayleigh backscattering light in a unit pulse and has a wide range of application scenarios. At present, the phase demodulation solutions of a phase demodulation distributed monitoring system mainly consist of two solutions, i.e., phase generated carrier (PGC) and 3×3 coupler demodulation.

The PGC solution requires the addition of carrier and requires signal acquisition for the interference light and the modulation waves simultaneously, that is, it needs to demodulate two signals at the same time, so both the frequency and the amplitude of the carrier need to be quantized strictly to meet the requirement of the system demodulation accuracy, in addition, the dynamic range of the system is limited by the carrier frequency. The 3×3 coupler demodulation requires simultaneous signal acquisition of three signals, which involves larger data amount and makes the system complicated. The principle of the 3×3 coupler demodulation is based on an angle of 120°, but the 3×3 coupler actually produced do not precisely have the 120°, thus, the angle of the 3×3 coupler also affects the demodulation accuracy.

To sum up, the process of acquiring demodulation data in the prior art is relatively complicated, and there are many factors affecting accuracy, resulting in low accuracy of the acquired demodulation data.

SUMMARY

An object of the present disclosure is to provide an optical fiber distributed monitoring system and method in order to improve the above problems. In order to achieve the object, the technical solution adopted in the present disclosure is as follows:

In a first aspect, an embodiment of the present disclosure provides an optical fiber distributed monitoring system, comprising a laser device, an acousto-optic modulator, a phase matching interferometer, a photoelectric detector and a phase demodulation module. The laser device is configured to output continuous laser light, wherein the continuous laser light is transmitted into the acousto-optic modulator, and the acousto-optic modulator is configured to chop the continuous laser light into pulsed light. The pulsed light is transmitted into a sensing optical fiber, wherein the sensing optical fiber is configured to output, upon detection of a vibration or acoustic wave signal, Rayleigh backscattering light containing the vibration or acoustic wave signal, and the Rayleigh backscattering light is transmitted into the phase matching interferometer. The phase matching interferometer is configured to split the Rayleigh backscattering light into a first portion of Rayleigh backscattering light and a second portion of Rayleigh backscattering light, to phase-modulate the first portion of Rayleigh backscattering light by applying a first modulation wave to a first arm of the phase matching interferometer, and to phase-modulate the second portion of Rayleigh backscattering light by applying a second modulation wave to a second arm of the phase matching interferometer, wherein the phase-modulated first portion of Rayleigh backscattering light and the phase-modulated second portion of Rayleigh backscattering light, with a phase difference therebetween in a range of 0-2$\pi$, interfere with each other to generate interference light. An amplitude difference between the first modulation wave and the second modulation wave is greater than or equal to an amplitude difference threshold enabling an optical phase difference between the two arms of the phase matching interferometer to be 2$\pi$, and each of the waveform of the first modulation wave and the waveform of the second modulation wave is any one of a triangle wave, a sawtooth wave and a sine wave. The phase matching interferometer is further configured to transmit the interference light into the photoelectric detector. The photoelectric detector is configured to convert the interference light into an interference electric signal and to send the interference electric signal to the phase demodulation module. The phase demodulation module is configured to phase-demodulate the interference electric signal based on a Hilbert algorithm to obtain vibration or acoustic wave information.

In a second aspect, an embodiment of the present disclosure provides an optical fiber distributed monitoring method, applicable to the optical fiber distributed monitoring system described above in the first aspect. The method comprises:

the laser device outputting continuous laser light to the acousto-optic modulator;

the acousto-optic modulator chopping the continuous laser light into pulsed light;

making the pulsed light input to the circulator through the first end and the circulator outputting the Rayleigh backscattering light through the third end;

the phase matching interferometer splitting the Rayleigh backscattering light into a first portion of Rayleigh backscattering light and a second portion of Rayleigh backscattering light, phase-modulating the first portion of Rayleigh backscattering light by applying a first modulation wave to a first arm of the phase matching interferometer, and phase-modulating the second portion of Rayleigh backscattering light by applying a second modulation wave to a second arm of the phase matching interferometer, wherein the phase-modulated first portion of Rayleigh backscattering light and the phase-modulated second portion of Rayleigh backscattering light, with a phase difference therebetween in a range of 0-2$\pi$, interfere with each other to generate interference light, an amplitude difference between the first modulation wave and the second modulation wave is greater than or equal to an amplitude difference threshold enabling an optical phase difference between the two arms of the phase matching interferometer to be 2π, and each of the waveform of the first modulation wave and the waveform of the second modulation wave is any one of a triangle wave, a sawtooth wave and a sine wave;

the photoelectric detector converting the interference light into an interference electric signal and sending the interference electric signal to the phase demodulation module; and the phase demodulation module being configured to perform the following: performing Hilbert transform on the interference electric signal to obtain a Hilbert transform signal, obtaining a first differential signal by performing a differential operation on the Hilbert transform signal, obtaining a first product signal by multiplying the first differential signal with the interference electric signal, obtaining a second differential signal by performing a differential operation on the interference electric signal, obtaining a second product signal by multiplying the Hilbert transform signal with the second differential signal, obtaining a difference signal by subtracting the second product signal from the first product signal, obtaining an integrated signal by performing an integral operation on the difference signal, and obtaining vibration or acoustic wave information by performing filtering processing on the integrated signal.

Other features and advantages of the present disclosure will be set forth in the following description and will partly become apparent from the description, or will be understood by implementing the embodiments of the present disclosure. The objects and other advantages of the present disclosure may be achieved and obtained by the structures specifically indicated in the description, the claims and the drawings.

BRIEF DESCRIPTION OF DRAWINGS

In order to more clearly illustrate the technical solutions of the embodiments of the present disclosure, brief description is made below on the drawings required to be used in the embodiments. It should be understood that the following drawings only illustrate some of the embodiments of the present disclosure and shall not be regarded as a limitation to the scope, and for a person of ordinary skills in the art, other related drawings may be obtained from these drawings without inventive effort.

REFERENCE SIGNS

Figure 1:
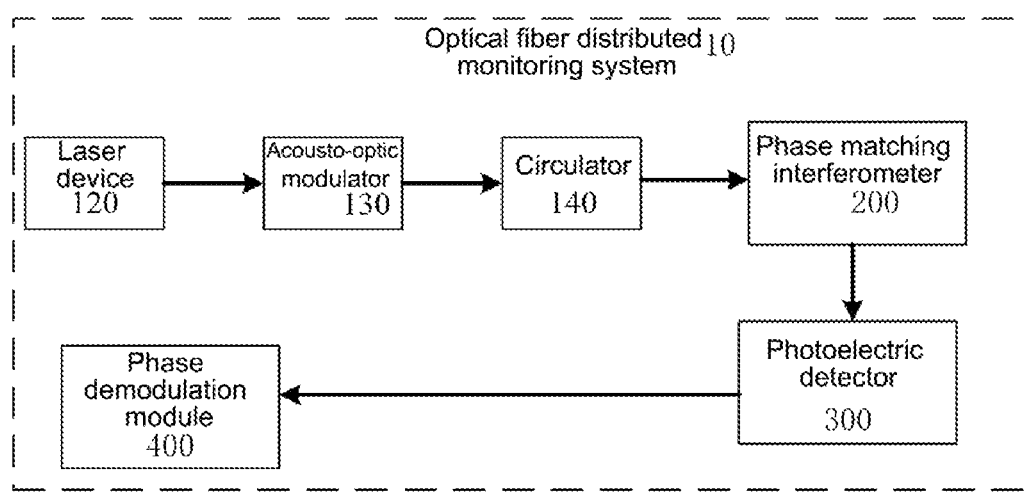
FIG. 1 is a connection block diagram of an optical fiber distributed monitoring system according to an embodiment of the present disclosure.

10—optical fiber distributed monitoring system; 60—filter; 120—laser device; 130—acousto-optic modulator; 140—circulator; 200—phase matching interferometer; 220—coupler; 300—photoelectric detector; and 400—phase demodulation module.

DETAILED DESCRIPTION OF EMBODIMENTS

In order to make the objects, technical solutions and advantages of the embodiments of the present disclosure clearer, the technical solutions of the embodiments of the present disclosure will be described clearly and completely below with reference to the drawings of the embodiments of the present disclosure. Apparently, the embodiments described are some of the embodiments of the present disclosure, rather than all of the embodiments. The components of the embodiments of the present disclosure described and illustrated in the drawings herein can generally be arranged and designed in a variety of different configurations. Thus, the following detailed description of the embodiments of the present disclosure provided in the drawings is not intended to limit the scope of protection of the present disclosure, but is merely representative of the selected embodiments of the present disclosure. All the other embodiments that are obtained by a person of ordinary skills in the art without inventive effort on the basis of the embodiments of the present disclosure shall be covered by the scope of protection of the present disclosure.

It should be noted that similar reference signs and letters denote similar items in the following drawings, and therefore, once a certain item is defined in one figure, it does not need to be further defined and explained in the subsequent figures. Moreover, in the description of the present disclosure, the terms such as "first" and "second" are only used for differentiated description and cannot be understood as indication or implication of relative importance.

Figure 2:
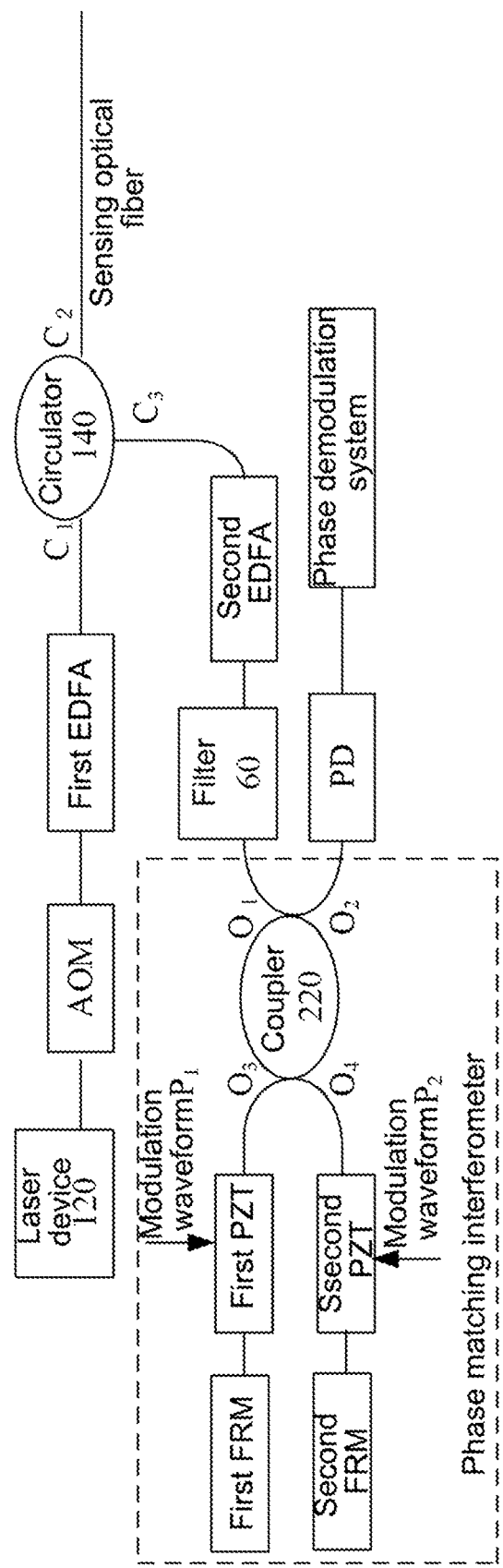
FIG. 2 is another connection block diagram of the optical fiber distributed monitoring system according to an embodiment of the present disclosure.

Referring to FIG. 1 and FIG. 2, an embodiment of the present disclosure provides an optical fiber distributed monitoring system 10. The system 10 comprises a laser device 120, an acousto-optic modulator 130, a phase matching interferometer 200, a photoelectric detector 300 and a phase demodulation module 400. The laser device 120 is configured to output continuous laser light, wherein the continuous laser light is transmitted into the acousto-optic modulator 130, and the acousto-optic modulator 130 is configured to chop the continuous laser light into pulsed light. The pulsed light is transmitted into a sensing optical fiber, wherein the sensing optical fiber is configured to output, upon detection of a vibration or acoustic wave signal, Rayleigh backscattering light containing the vibration or acoustic wave signal, and the Rayleigh backscattering light is transmitted into the phase matching interferometer 200. The phase matching interferometer 200 is configured to split the Rayleigh backscattering light into a first portion of Rayleigh backscattering light and a second portion of Rayleigh backscattering light, for phase-modulating the first portion of Rayleigh backscattering light by applying a first modulation wave to a first arm of the phase matching interferometer 200, and for phase-modulating the second portion of Rayleigh backscattering light by applying a second modulation wave to a second arm of the phase matching interferometer 200, wherein the phase-modulated first portion of Rayleigh backscattering light and the phase-modulated second portion of Rayleigh backscattering light, with a phase difference therebetween in a range of 0-2π, interfere with each other to generate interference light. An amplitude difference between the first modulation wave and the second modulation wave is greater than or equal to an amplitude difference threshold enabling an optical phase difference between the two arms of the phase matching interferometer 200 to be 2π, and each of the waveform of the first modulation wave and the waveform of the second modulation wave is any one of a triangle wave, a sawtooth wave and a sine wave. The phase matching interferometer 200 is further configured to transmit the interference light into the photoelectric detector 300. The photoelectric detector 300 is configured to convert the interference light into an interference electric signal and to send the interference electric signal to the phase demodulation module 400. The phase demodulation module 400 is configured to phase-demodulate the interference electric signal based on a Hilbert algorithm to obtain vibration or acoustic wave information.

Further, in an embodiment of the present disclosure, when the phase matching interferometer 200 phase-modulates the acquired Rayleigh backscattering light, the Rayleigh backscattering light is split into two portions and the two portions of Rayleigh backscattering light enter the two arms of the phase matching interferometer 200, respectively, and modulation waves are added thereto respectively to phase-modulate the Rayleigh backscattering light. After phase modulation, the Rayleigh backscattering light of the two arms of the phase matching interferometer 200 have a phase difference therebetween within the range of 0-2π and interfere with each other to generate interference light. When performing phase demodulation based on a Hilbert algorithm, the phase demodulation module 400 only needs to acquire the interference light signals and does not need to sample the signals of the modulation waves. Thus, on the one hand, single-channel acquisition is realized, and on the other hand, the requirements on the amplitude and waveform of the added modulation waves are not as strict as those for the modulation waves in the PGC solution, and it is sufficient that the amplitude difference between the modulation waves is greater than or equal to an amplitude difference threshold enabling an optical phase difference between the two arms of the phase matching interferometer 200 to be 2π. Moreover, the waveform is any one of a triangular wave, a sawtooth wave and a sine wave. Therefore, compared with the three-channel acquisition of the 3×3 coupler solution and the two-channel signal acquisition of the PGC solution, the system in the embodiments of the present disclosure has a simple structure, and further, as the structure of the system is simplified, the failure rate of the system is reduced, the data processing amount of the system is reduced, and the factors affecting the demodulation accuracy are thereby reduced, making it possible to acquire the vibration or acoustic wave information of the environment more accurately and conveniently.

Further, in an embodiment of the present disclosure, when the phase demodulation module 400 acquires the vibration and acoustic wave information of the environment based on the Hilbert algorithm, the condition that the phase difference between the light of the two arms of the phase matching interferometer 200 after phase modulation is within the range of 0-2π needs to be met. In order to make the phase difference between the light of the two arms of the phase matching interferometer 200 after phase modulation be within the range of 0-2π, the amplitude difference between the added first modulation wave and second modulation wave only needs to meet the condition of being greater than or equal to an amplitude difference threshold enabling an optical phase difference between the two arms of the phase matching interferometer 200 to be of 2π.

Optionally, the phase matching interferometer 200 comprises a coupler 220, and the first arm of the phase matching interferometer 200 comprises a first piezoelectric ceramic, a first Faraday rotator mirror and a first optical fiber, wherein the first optical fiber is wound on the first piezoelectric ceramic. The Rayleigh backscattering light, after entering a first end of the coupler, has the first portion which is output from a third end of the coupler 220 to the first optical fiber, and the first modulation wave is applied to the first piezoelectric ceramic to phase-modulate the first portion of Rayleigh backscattering light. The phase-modulated first portion of Rayleigh backscattering light travels through the first optical fiber and is reflected back to the third end by the first Faraday rotator mirror.

The second arm of the phase matching interferometer 200 comprises a second piezoelectric ceramic, a second Faraday rotator mirror and a second optical fiber, wherein the second optical fiber is wound on the second piezoelectric ceramic. The Rayleigh backscattering light, after entering the first end of the coupler 220 has the second portion which is output from a fourth end of the coupler 220 to the second optical fiber. The second modulation wave is applied to the second piezoelectric ceramic to phase-modulate the second portion of Rayleigh backscattering light. The phase-modulated second portion of Rayleigh backscattering light travels through the second optical fiber and is reflected back to the fourth end by the second Faraday rotator mirror.

Optionally, the sensing optical fiber is placed in the environment under test, and transmits Rayleigh backscattering light with parameter information into the phase matching interferometer 200 when the parameters of the environment under test are changed. It should be noted that in the embodiments of the present disclosure, the parameter information may be vibration or acoustic wave information, but is not limited to merely vibration or acoustic wave information, and in the specific embodiments, the parameter information may be other information.

Optionally, the system 10 further comprises a first amplifier and a circulator 140. An optical pulse sequence, after being amplified by the first amplifier, enters a first end of the circulator 140 and is transmitted from a second end of the circulator 140 into the sensing optical fiber; and the Rayleigh backscattering light is output from a third end of the circulator 140 to the first end of the coupler 220.

Optionally, the system further comprises a second amplifier and a filter 60, the Rayleigh backscattering light output from the third end of the circulator 140 is sequentially amplified by the second amplifier and filtered by the filter 60, and then transmitted to the first end of the coupler 220.

Further, in an embodiment of the present disclosure, there are no particular limitations on the waveform of the first modulation wave and the waveform of the second modulation wave, which may be triangular waves, sawtooth waves or sine waves, as long as the condition that the highest frequency $f_c$ of the modulation waves is a half of the sampling rate $f_s$ of the phase demodulation system, i.e., the condition $f_c < \frac{1}{2} f_s$ is met. Meanwhile, the first modulation wave and the second modulation wave may be used separately or in combination. For example, when the first modulation wave is applied to the first piezoelectric ceramic, the second modulation wave may not be applied to the second piezoelectric ceramic; but the second modulation wave may also be applied to the second piezoelectric ceramic. Further, in the case where the first modulation wave and the second modulation wave are simultaneously added, when the waveform of the first modulation wave is selected as a triangular wave, the waveform of the second modulation waveform may be selected as any one of a triangular wave, a sawtooth wave and a sine wave. It is sufficient that the amplitude difference between the first modulation wave and the second modulation wave is greater than or equal to an amplitude difference threshold enabling an optical phase difference between the two arms of the phase matching interferometer 200 to be 2π. Therefore, the selection for the waveform of the first modulation wave and the waveform of the second modulation wave is relatively flexible and more practical, which enhances practicality and convenience of the optical fiber distributed monitoring system.

Further, referring to FIG. 2, the laser device 120 is configured to output continuous laser light of narrow linewidth. The continuous laser light of narrow linewidth is transmitted to the acousto-optic modulator 130. The acousto-optic modulator 130 is configured to chop the received continuous laser light of narrow linewidth into optical pulse sequences. The optical pulse sequence, after being amplified by the first amplifier, enters a first end of the circulator 140 and is transmitted from the second end of the circulator 140 into the sensing optical fiber. The sensing optical fiber outputs, upon detection of a vibration or acoustic wave signal, Rayleigh backscattering light containing the vibration or acoustic wave signal, and the Rayleigh backscattering light is output from a third end of the circulator 140 to the phase matching interferometer 200.

Further, in FIG. 2, AOM is the acousto-optic modulator 130, capable of converting the laser light emitted by the laser device 120 into pulsed light. EDFA is an amplifier, and C1, C2 and C3 are the first end of the circulator 140, the second end of the circulator 140 and the third end of the circulator 140, respectively. PD is the photoelectric detector 300.

Optionally, the first amplifier and the second amplifier may be erbium-doped optical fiber amplifiers.

Optionally, the coupler 220 may be a 2×2 coupler 220 having a light splitting ratio of 1:1.

Optionally, each of the first piezoelectric ceramic and the second piezoelectric ceramic may has a diameter ranging from 1 cm to 3 cm.

Further, in FIG. 2, Q1, Q2, Q3 and Q4 are the first end of the coupler 220, the second end of the coupler 220, the third end of the coupler 220 and the fourth end of the coupler 220, respectively. Each of the PZTs is a piezoelectric ceramic wherein the piezoelectric ceramic is characterized in that when the voltage applied across the two ends of piezoelectric ceramic changes, the size of the piezoelectric ceramic also changes. Each of the FRMs is a Faraday rotator mirror that is configured to reflect back the modulated light, for example, the first Faraday rotator mirror may reflect the phase-modulated first portion of Rayleigh backscattering light back to the third end of the coupler 220; and the second Faraday rotator mirror may reflect the phase-modulated second portion of Rayleigh backscattering light back to the fourth end of the coupler 220.

Optionally, the phase-modulated first portion of Rayleigh backscattering light and the phase-modulated second portion of Rayleigh backscattering light generate an interference light signal which is output from the second end of the coupler 220 to the photoelectric detector 300. The photoelectric detector 300 converts the interference light signal into an interference electric signal, and sends the interference electric signal to the phase demodulation module 400.

Optionally, the phase demodulation module 400 is configured to perform Hilbert transform on the interference electric signal to obtain a Hilbert transform signal; and to obtain vibration or acoustic wave information based on the interference electric signal and the Hilbert transform signal.

Optionally, the phase demodulation module 400 is configured to perform the following: obtaining a first differential signal by performing a differential operation on the Hilbert transform signal, obtaining a first product signal by multiplying the first differential signal with the interference electric signal, obtaining a second differential signal by performing a differential operation on the interference electric signal, obtaining a second product signal by multiplying the Hilbert transform signal with the second differential signal, obtaining a difference signal by subtracting the second product signal from the first product signal, obtaining an integrated signal by performing an integral operation on the difference signal, and obtaining vibration or acoustic wave information by performing filtering processing on the integrated signal.

Figure 3:
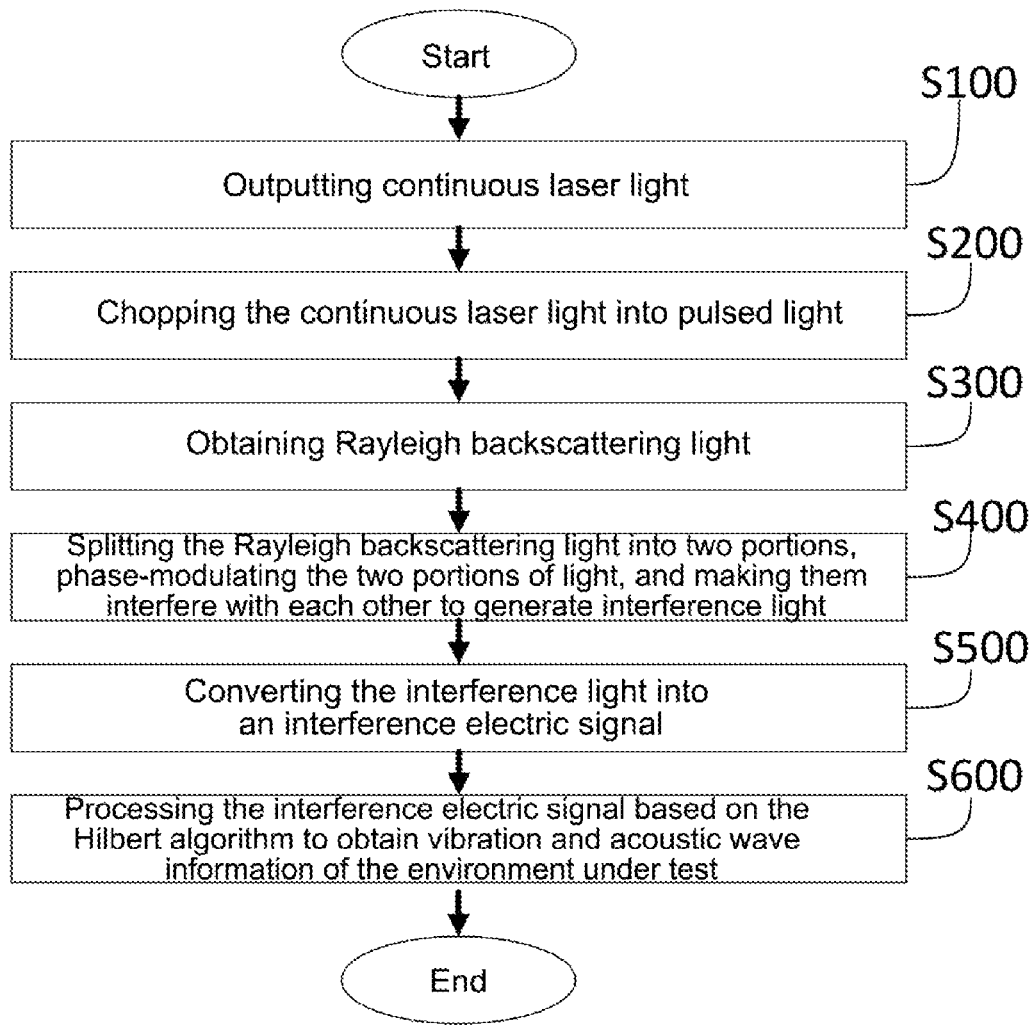
FIG. 3 is a flowchart of an optical fiber distributed monitoring method according to an embodiment of the present disclosure.

Optionally, referring to FIG. 3, an embodiment of the present disclosure provides an optical fiber distributed monitoring method, applicable to the optical fiber distributed monitoring system 10 described in the first aspect above. The specific implementation of the present disclosure is further understood in connection with the method, the method comprising:

S100: the laser device outputting continuous laser light to the acousto-optic modulator;

S200: the acousto-optic modulator chopping the continuous laser light into pulsed light;

S300: making the pulsed light input to the circulator through the first end and the circulator outputting the Rayleigh backscattering light through the third end;

S400: the phase matching interferometer splitting the Rayleigh backscattering light into a first portion of Rayleigh backscattering light and a second portion of Rayleigh backscattering light, phase-modulating the first portion of Rayleigh backscattering light by applying a first modulation wave to a first arm of the phase matching interferometer, and phase-modulating the second portion of Rayleigh backscattering light by applying a second modulation wave to a second arm of the phase matching interferometer, wherein the phase-modulated first portion of Rayleigh backscattering light and the phase-modulated second portion of Rayleigh backscattering light, with a phase difference therebetween in a range of 0-2π, interfere with each other to generate interference light, an amplitude difference between the first modulation wave and the second modulation wave is greater than or equal to an amplitude difference threshold enabling an optical phase difference between the two arms of the phase matching interferometer to be 2π, and each of the waveform of the first modulation wave and the waveform of the second modulation wave is any one of a triangle wave, a sawtooth wave and a sine wave;

S500: the photoelectric detector converting the interference light into an interference electric signal and transmitting the interference electric signal to the phase demodulation module; and S600: the phase demodulation module being configured to perform the following: performing Hilbert transform on the interference electric signal to obtain a Hilbert transform signal, obtaining a first differential signal by performing a differential operation on the Hilbert transform signal, obtaining a first product signal by multiplying the first differential signal with the interference electric signal, obtaining a second differential signal by performing a differential operation on the interference electric signal, obtaining a second product signal by multiplying the Hilbert transform signal with the second differential signal, obtaining a difference signal by subtracting the second product signal from the first product signal, obtaining an integrated signal by performing an integral operation on the difference signal, and obtaining vibration or acoustic wave information by performing filtering processing on the integrated signal.

Figure 4:
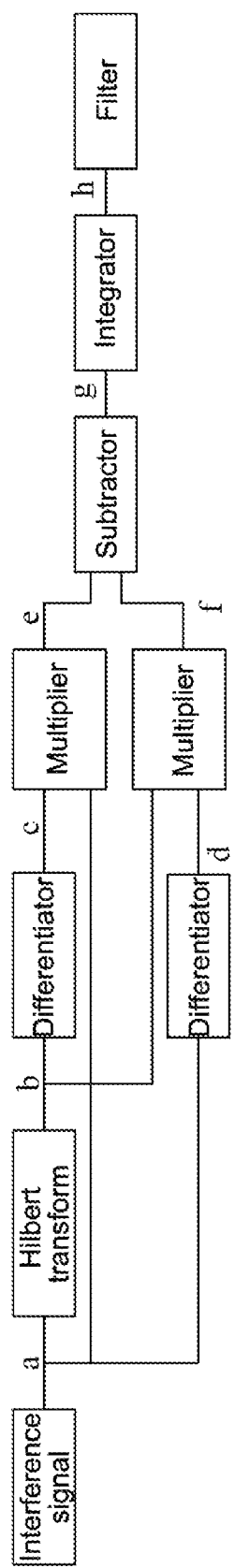
FIG. 4 is a flowchart of a Hilbert algorithm according to an embodiment of the present disclosure.

Further, the above algorithms are all implemented by hardware of the system, and a, b, c, d, e, f and g in FIG. 4 each represent a signal, wherein a represents an interference signal, b represents a Hilbert transform signal, c represents a first differential signal, d represents a second differential signal, e represents a first product signal, f represents a second product signal, g represents a difference signal, and h represents an integrated signal.

Further, as can be seen from FIG. 4, the above-mentioned steps are that the interference signal a is transformed into signal b by Hilbert transform, signal b is subjected to a differential operation by a differentiator to obtain signal c, signal c is multiplied with the interference signal a to obtain signal e, the interference signal a is subjected to a differential operation to obtain signal d, signal b is multiplied with signal d to obtain signal f, signal f is subtracted from signal e to obtain signal g, signal g is subjected to an integral operation to obtain signal h, and signal h is filtered to finally obtain vibration/acoustic wave information. As can be seen from the above-mentioned Hilbert algorithm, only the interference electric signal is needed in the final algorithm-based processing. Therefore, the method is relatively simple and easy to implement and has high practicality.

The embodiments of the present disclosure provide an optical fiber distributed monitoring system and method. The system comprises a laser device, an acousto-optic modulator, a phase matching interferometer, a photoelectric detector and a phase demodulation module. The laser device is configured to output continuous laser light, wherein the laser light is transmitted into the acousto-optic modulator, and the acousto-optic modulator is configured to chop the continuous laser light into pulsed light. The pulsed light is transmitted into a sensing optical fiber, wherein the optical fiber is configured to output, upon detection of a vibration or acoustic wave signal, Rayleigh backscattering light containing the vibration or acoustic wave signal, and the Rayleigh backscattering light is transmitted into the phase matching interferometer. The phase matching interferometer is configured to split the Rayleigh backscattering light into a first portion of Rayleigh backscattering light and a second portion of Rayleigh backscattering light, for phase-modulating the first portion of Rayleigh backscattering light by applying a first modulation wave to a first arm of the phase matching interferometer, and for phase-modulating the second portion of Rayleigh backscattering light by applying a second modulation wave to a second arm of the phase matching interferometer, wherein the phase-modulated first portion of Rayleigh backscattering light and the phase-modulated second portion of Rayleigh backscattering light, with a phase difference therebetween in a range of $0$-$2\pi$, interfere with each other to generate interference light. An amplitude difference between the first modulation wave and the second modulation wave is greater than or equal to an amplitude difference threshold enabling an optical phase difference between the two arms of the phase matching interferometer to be $2\pi$, and each of the waveform of the first modulation wave and the waveform of the second modulation wave is any one of a triangle wave, a sawtooth wave and a sine wave. The phase matching interferometer is further configured to transmit the interference light into the photoelectric detector. The photoelectric detector is configured to convert the interference light into an interference electric signal and to send the interference electric signal to the phase demodulation module. The phase demodulation module is configured to phase-demodulate the interference electric signal based on a Hilbert algorithm to obtain vibration or acoustic wave information. When the phase matching interferometer phase-modulates the acquired Rayleigh backscattering light, the Rayleigh backscattering light is split into two portions and the two portions of Rayleigh backscattering light enter the two arms of the phase matching interferometer, respectively, and modulation waves are added thereto respectively to phase-modulate the Rayleigh backscattering light; after phase modulation, the Rayleigh backscattering light of the two arms of the phase matching interferometer have a phase difference therebetween within the range of $0$-$2\pi$ and interfere with each other to generate interference light; when performing phase demodulation based on the Hilbert algorithm, the phase demodulation module only needs to acquire the interference light signals and does not need to sample the signals of the modulation waves, thus, on the one hand, single-channel acquisition is realized, and on the other hand, the requirements on the amplitude and waveform of the added modulation waves are not as strict as those for the modulation waves in the PGC solution, and it is sufficient that the amplitude difference between the modulation waves is greater than or equal to an amplitude difference threshold enabling an optical phase difference between the two arms of the phase matching interferometer to be $2\pi$. Moreover, the waveform is any one of a triangular wave, a sawtooth wave and a sine wave. Therefore, compared with the three-channel acquisition of the 3×3 coupler solution and the two-channel signal acquisition of the PGC solution, the system in the embodiments of the present disclosure has a simple structure, and further, as the structure of the system is simplified, the failure rate of the system is reduced, the data processing amount of the system is reduced, and the factors affecting the demodulation accuracy are thereby reduced, making it possible to acquire the vibration or acoustic wave information of the environment more accurately and conveniently.

The description above is only preferable embodiments of the present disclosure, which are not used to restrict the present disclosure. For those skilled in the art, the present disclosure may have various changes and variations. Any modifications, equivalent substitutions, improvements etc. within the spirit and principle of the present disclosure shall all be covered by the scope of protection of the present disclosure.

The invention claimed is:

1. An optical fiber distributed monitoring system, comprising a laser, an acousto-optic modulator, a phase matching interferometer, a photoelectric detector and a phase demodulation module, wherein the laser is configured to output continuous laser light which is transmitted to the acousto-optic modulator, and the acousto-optic modulator is configured to chop the continuous laser light into pulsed light;

the pulsed light is transmitted into a sensing optical fiber, the sensing optical fiber is configured to output, upon detection of a vibration or acoustic wave signal, Rayleigh backscattering light containing the vibration or acoustic wave signal, and the Rayleigh backscattering light is transmitted into the phase matching interferometer;

the phase matching interferometer is configured to split the Rayleigh backscattering light into a first portion of Rayleigh backscattering light and a second portion of Rayleigh backscattering light, for phase-modulating the first portion of Rayleigh backscattering light by applying a first modulation wave to a first arm of the phase matching interferometer, and for phase-modulating the second portion of Rayleigh backscattering light by applying a second modulation wave to a second arm of the phase matching interferometer, wherein the phase-modulated first portion of Rayleigh backscattering light and the phase-modulated second portion of Rayleigh backscattering light, with a phase difference therebetween in a range of $0$-$2\pi$, interfere with each other to generate interference light; an amplitude difference between the first modulation wave and the second modulation wave is greater than or equal to an amplitude difference threshold enabling an optical phase difference between the two arms of the phase matching interferometer to be $2\pi$, and each of the waveform of the first modulation wave and the waveform of the second modulation wave is any one of a triangle wave, a sawtooth wave and a sine wave;

the phase matching interferometer is further configured to transmit the interference light into the photoelectric detector;

the photoelectric detector is configured to convert the interference light into an interference electric signal and to send the interference electric signal to the phase demodulation module; and the phase demodulation module is configured to phase-demodulate the interference electric signal based on a Hilbert algorithm to obtain vibration or acoustic wave information.

2. The optical fiber distributed monitoring system according to claim 1, wherein the phase matching interferometer comprises a coupler, the first arm comprises a first piezoelectric ceramic, a first Faraday rotator mirror and a first optical fiber, the first optical fiber is wound on the first piezoelectric ceramic, the Rayleigh backscattering light, after entering a first end of the coupler, has the first portion which is output from a third end of the coupler to the first optical fiber, and the first modulation wave is applied to the first piezoelectric ceramic to phase-modulate the first portion of Rayleigh backscattering light, the phase-modulated first portion of Rayleigh backscattering light travels through the first optical fiber and is reflected back to the third end by the first Faraday rotator mirror; and the second arm comprises a second piezoelectric ceramic, a second Faraday rotator mirror and a second optical fiber, the second optical fiber is wound on the second piezoelectric ceramic, the Rayleigh backscattering light after entering the first end of the coupler has the second portion which is output from a fourth end of the coupler to the second optical fiber, the second modulation wave is applied to the second piezoelectric ceramic to phase-modulate the second portion of Rayleigh backscattering light, the phase-modulated second portion of Rayleigh backscattering light travels through the second optical fiber and is reflected back to the fourth end by the second Faraday rotator mirror, the phase-modulated first portion of Rayleigh backscattering light and the phase-modulated second portion of Rayleigh backscattering light generate interference light which is output from a second end of the coupler to the photoelectric detector.

3. The optical fiber distributed monitoring system according to claim 2, wherein the coupler is a 2×2 coupler having a light splitting ratio of 1:1.

4. The optical fiber distributed monitoring system according to claim 2, wherein each of the first piezoelectric ceramic and the second piezoelectric ceramic has a diameter ranging from 1 cm to 3 cm.

5. The optical fiber distributed monitoring system according to claim 2, wherein the system further comprises a first amplifier and a circulator, an optical pulse sequence, after being amplified by the first amplifier, enters a first end of the circulator and is transmitted from a second end of the circulator to the sensing optical fiber; and the Rayleigh backscattering light is output from a third end of the circulator to the first end of the coupler.

6. The optical fiber distributed monitoring system according to claim 5, wherein the system further comprises a second amplifier and a filter, the Rayleigh backscattering light output from the third end of the circulator is sequentially amplified by the second amplifier and filtered by the filter, and then transmitted to the first end of the coupler.

7. The optical fiber distributed monitoring system according to claim 1, wherein the phase demodulation module is configured to perform Hilbert transform on the interference electric signal to obtain a Hilbert transform signal; and to obtain vibration or acoustic wave information based on the interference electric signal and the Hilbert transform signal.

8. The optical fiber distributed monitoring system according to claim 7, wherein the phase demodulation module is configured to perform the following: obtaining a first differential signal by performing a differential operation on the Hilbert transform signal, obtaining a first product signal by multiplying the first differential signal with the interference electric signal, obtaining a second differential signal by performing a differential operation on the interference electric signal, obtaining a second product signal by multiplying the Hilbert transform signal with the second differential signal, obtaining a difference signal by subtracting the second product signal from the first product signal, obtaining an integrated signal by performing an integral operation on the difference signal, and obtaining vibration or acoustic wave information by performing filtering processing on the integrated signal.

9. An optical fiber distributed monitoring method, applicable to the optical fiber distributed monitoring system according to claim 1, the method comprising:

a laser device outputting continuous laser light to the acousto-optic modulator;

the acousto-optic modulator chopping the continuous laser light into pulsed light;

making the pulsed light input to the circulator through the first end and the circulator outputting the Rayleigh backscattering light through the third end;

the phase matching interferometer splitting the Rayleigh backscattering light into a first portion of Rayleigh backscattering light and a second portion of Rayleigh backscattering light, phase-modulating the first portion of Rayleigh backscattering light by applying a first modulation wave to a first arm of the phase matching interferometer, and phase-modulating the second portion of Rayleigh backscattering light by applying a second modulation wave to a second arm of the phase matching interferometer, wherein the phase-modulated first portion of Rayleigh backscattering light and the phase-modulated second portion of Rayleigh backscattering light, with a phase difference therebetween in a range of 0-$2\pi$ interfere with each other to generate interference light, an amplitude difference between the first modulation wave and the second modulation wave is greater than or equal to an amplitude difference threshold enabling an optical phase difference between the two arms of the phase matching interferometer to be $2\pi$, and each of the waveform of the first modulation wave and the waveform of the second modulation waveform is any one of a triangle wave, a sawtooth wave and a sine wave;

the photoelectric detector converting the interference light into an interference electric signal and transmitting the interference electric signal to the phase demodulation module; and the phase demodulation module being configured to perform the following: performing Hilbert transform on the interference electric signal to obtain a Hilbert transform signal, obtaining a first differential signal by performing a differential operation on the Hilbert transform signal, obtaining a first product signal by multiplying the first differential signal with the interference electric signal, obtaining a second differential signal by performing a differential operation on the interference electric signal, obtaining a second product signal by multiplying the Hilbert transform signal with the second differential signal, obtaining a difference signal by subtracting the second product signal from the first product signal, obtaining an integrated signal by performing an integral operation on the difference signal, and obtaining vibration or acoustic wave information by performing filtering processing on the integrated signal.

10. The optical fiber distributed monitoring method according to claim 9, wherein the phase matching interferometer comprises a coupler, the first arm comprises a first piezoelectric ceramic, a first Faraday rotator mirror and a first optical fiber, the first optical fiber is wound on the first piezoelectric ceramic, the Rayleigh backscattering light, after entering a first end of the coupler, has the first portion which is output from a third end of the coupler to the first optical fiber, and the first modulation wave is applied to the first piezoelectric ceramic to phase-modulate the first portion of Rayleigh backscattering light, the phase-modulated first portion of Rayleigh backscattering light travels through the first optical fiber and is reflected back to the third end by the first Faraday rotator mirror; and the second arm comprises a second piezoelectric ceramic, a second Faraday rotator mirror and a second optical fiber, the second optical fiber is wound on the second piezoelectric ceramic, the Rayleigh backscattering light after entering the first end of the coupler has the second portion which is output from a fourth end of the coupler to the second optical fiber, the second modulation wave is applied to the second piezoelectric ceramic to phase-modulate the second portion of Rayleigh backscattering light, the phase-modulated second portion of Rayleigh backscattering light travels through the second optical fiber and is reflected back to the fourth end by the second Faraday rotator mirror, the phase-modulated first portion of Rayleigh backscattering light and the phase-modulated second portion of Rayleigh backscattering light generate interference light which is output from a second end of the coupler to the photoelectric detector.

11. The optical fiber distributed monitoring method according to claim 10, wherein the coupler is a 2×2 coupler having a light splitting ratio of 1:1.

12. The optical fiber distributed monitoring method according to claim 10, wherein each of the first piezoelectric ceramic and the second piezoelectric ceramic has a diameter ranging from 1 cm to 3 cm.

13. The optical fiber distributed monitoring method according to claim 10, wherein the system further comprises a first amplifier and a circulator, an optical pulse sequence, after being amplified by the first amplifier, enters a first end of the circulator and is transmitted from a second end of the circulator to the sensing optical fiber; and the Rayleigh backscattering light is output from a third end of the circulator to the first end of the coupler.

14. The optical fiber distributed monitoring method according to claim 13, wherein the system further comprises a second amplifier and a filter, the Rayleigh backscattering light output from the third end of the circulator is sequentially amplified by the second amplifier and filtered by the filter, and then transmitted to the first end of the coupler.

15. The optical fiber distributed monitoring method according to claim 9, wherein the phase demodulation module is configured to perform Hilbert transform on the interference electric signal to obtain a Hilbert transform signal; and to obtain vibration or acoustic wave information based on the interference electric signal and the Hilbert transform signal.

16. The optical fiber distributed monitoring method according to claim 15, wherein the phase demodulation module is configured to perform the following: obtaining a first differential signal by performing a differential operation on the Hilbert transform signal, obtaining a first product signal by multiplying the first differential signal with the interference electric signal, obtaining a second differential signal by performing a differential operation on the interference electric signal, obtaining a second product signal by multiplying the Hilbert transform signal with the second differential signal, obtaining a difference signal by subtracting the second product signal from the first product signal, obtaining an integrated signal by performing an integral operation on the difference signal, and obtaining vibration or acoustic wave information by performing filtering processing on the integrated signal.

* * * * *